United States Patent

Inage et al.

Patent Number: 5,265,087
Date of Patent: Nov. 23, 1993

[54] INFORMATION MEDIUM WITH IMPROVED TEMPERATURE CHARACTERISTICS

[75] Inventors: Nobuo Inage, Tokyo; Kazuharu Odawara, Yokohama; Ryoji Yamaguchi, Tokyo, all of Japan

[73] Assignee: Kabushiki Kaisha Toshiba, Kawasaki, Japan

[21] Appl. No.: 803,780

[22] Filed: Dec. 6, 1991

Related U.S. Application Data

[63] Continuation of Ser. No. 540,447, Jun. 15, 1990, abandoned, which is a continuation of Ser. No. 125,286, Nov. 25, 1987, abandoned.

Foreign Application Priority Data

Nov. 28, 1986 [JP] Japan .................. 61-281951

[51] Int. Cl.$^5$ .................................. G11B 7/24
[52] U.S. Cl. .................... 369/290; 369/270; 369/271
[58] Field of Search ............. 369/270, 271, 290, 291; 360/98.07, 98.08, 99.04, 99.05, 131, 132, 133

[56] References Cited

U.S. PATENT DOCUMENTS

| | | | |
|---|---|---|---|
| 3,706,085 | 12/1972 | Mowrey et al. | 369/270 |
| 4,322,841 | 3/1982 | Borchard et al. | 369/271 |
| 4,634,617 | 1/1987 | Ohta et al. | 369/290 |
| 4,733,388 | 3/1988 | Fujimoto et al. | 369/270 |
| 4,785,444 | 11/1988 | Nakane et al. | 369/271 |
| 4,827,470 | 5/1989 | Odawara et al. | 369/271 |
| 4,866,697 | 9/1989 | Yamaguchi et al. | 369/290 |

FOREIGN PATENT DOCUMENTS 59-210580  11/1984  Japan .................. 360/99.05

*Primary Examiner*—John Shepperd
*Assistant Examiner*—Edward H. Sikorski
*Attorney, Agent, or Firm*—Cushman, Darby & Cushman

[57] ABSTRACT

An information memory medium (10) includes disk-shaped substrates (30a, 30b) and recording layers (32a, 32b). It also has a centering member (38a, 38b) whose coefficient of thermal expansion resembles that of the substrates (30a, 30b). Two flat magnetic members (40a, 40b) are situated in annular depressions (68a, 68b) provided in the centering member. The annular depressions are larger than the magnetic members so that differences in thermal expansion can be absorbed.

2 Claims, 4 Drawing Sheets

INFORMATION MEDIUM WITH IMPROVED TEMPERATURE CHARACTERISTICS

This is a continuation of application Ser. No. 07/540,447, filed on Jun. 15, 1990, now abandoned, which was abandoned upon the filing hereof which is a continuation of Ser. No. 07/125,286, filed Nov. 25, 1987, now abandoned.

BACKGROUND OF THE INVENTION

1. Field of the Invention

The present invention relates to an information memory medium, and more particularly to an optical recording disk used for an information processing apparatus for recording, reproducing or erasing information.

2. Discussion of Background

Recently, information processing apparatus have been used for recording or reproducing image information on and from an optical recording disk as an information memory.

In the information processing apparatus of this type, the optical recording disk is mounted on a turntable and rotated so that the apparatus may perform information processing, such as recording or reproduction, on or from the optical recording disk. In order to support the optical recording disk on the turntable in the information processing apparatus, the optical recording disk is magnetically attracted by a magnetic attraction member provided on the turntable. The magnetic attraction member attracts an attractable member which is disposed on a central portion of the outside surface of the optical recording disk. In the clamp mechanism, the optical recording disk may be mounted stably on the turntable, irrespective of the thickness of the disk.

Example of the clamp mechanism of this type is disclosed in a related U.S. application, Ser. No. 004,097 filed Jan. 16, 1987, by the same assignee, now U.S. Pat. No. 4,982,399.

This related application describes an optical recording disk having the attractable member including a centering member and a magnetic member. The magnetic member is attached to the centering member by a mounting mechanism which includes retaining portions formed on the centering member and retaining claws formed on the magnetic member. Each of the retaining portions includes an aperture, large enough to allow insertion of its corresponding claw therein, an engaging projection projecting into the aperture, and the like. Each of the claws includes a vertical portion extending vertically from the magnetic member and a horizontal portion extending parallel to the magnetic member, from the extended end of the vertical portion. The claws are arranged corresponding in position to the retaining portions, so that they may engage with the retaining portions. However, in the optical recording disk of this type, since the claws must be formed in the magnetic member and engaging structure must be formed in the centering member, the centering member and the magnetic member are complicated in construction.

SUMMARY OF THE INVENTION

Accordingly, it is an object of the present invention to provide a new and improved information memory medium which may be mounted securely on a turntable.

It is an another object of the present invention to provide an information memory medium which is simple in construction.

In accordance with the present invention, the foregoing objects are achieved by providing an information memory medium, adapted for processing information with a drive mechanism including a turntable for rotating the information memory medium and a magnetic attraction member for magnetically attracting the information memory medium toward the turntable, which information memory medium includes a disk-shaped body having a recording layer for storing information; a centering member, disposed on the surface of the body at the central portion of the body, for centering the body on the turntable; and a magnetic member attached to the centering member and adapted to be attracted by the magnetic attraction member, the magnetic member having a completely flat and annular-shaped body.

BRIEF DESCRIPTION OF THE DRAWINGS

A more complete appreciation of the present invention and many of its attendant advantages will be readily obtained as the same becomes better understood by reference to the following detailed description when considered in connection with the accompanying drawings, wherein.

DETAILED DESCRIPTION OF THE PREFERRED EMBODIMENTS

Figure 1:
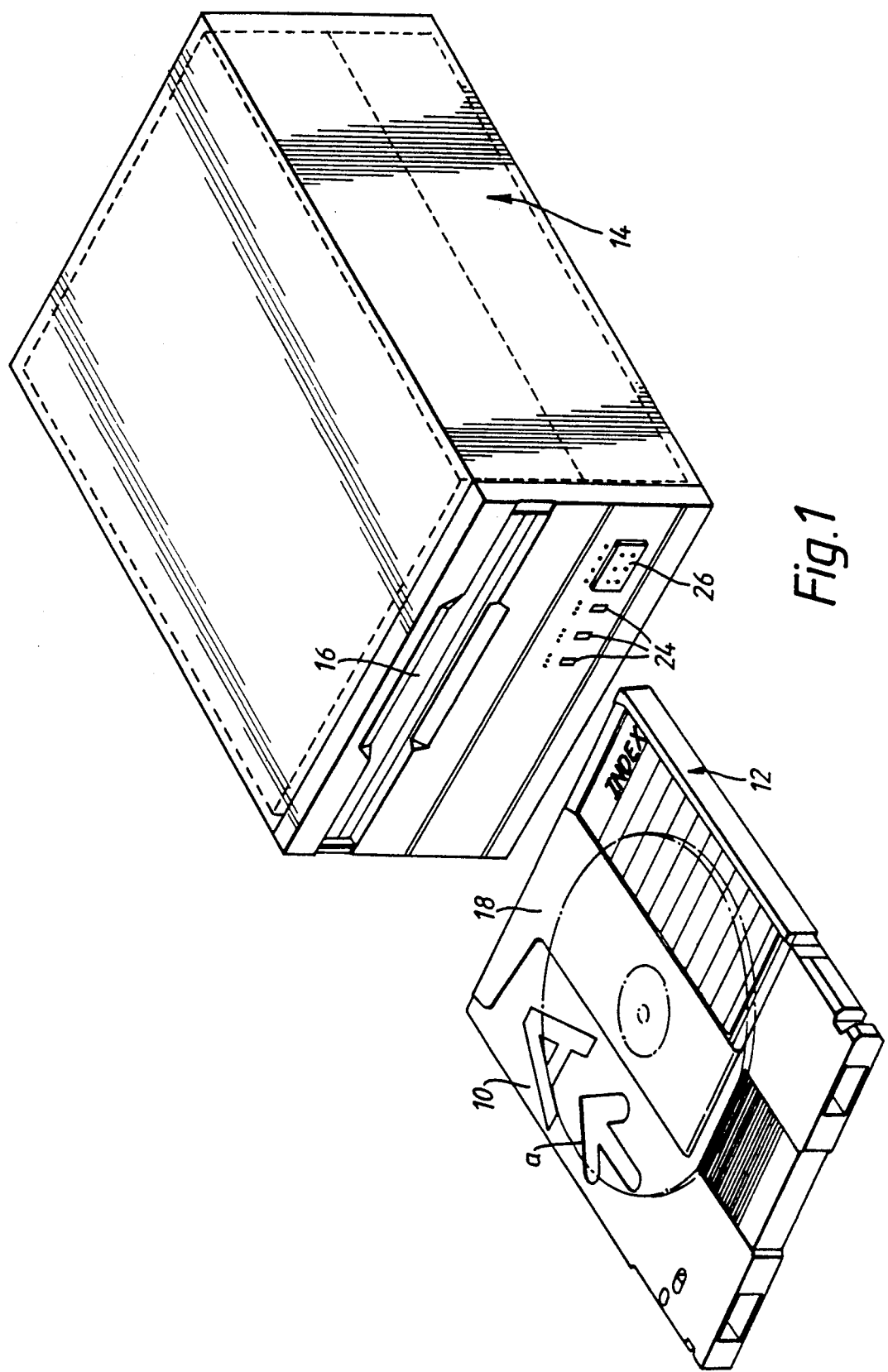
FIG. 1 is a perspective view showing the outer appearance of an information memory medium and an information processing apparatus of the present invention.

Referring now to the drawings, wherein like reference numerals designate identical or corresponding parts throughout the several views, and more particularly to FIG. 1 thereof, an information memory medium such as an optical recording disk is generally designated 10. Optical recording disk 10 is used for recording or reproducing information, and is accommodated in a cartridge 12.

Figure 2:
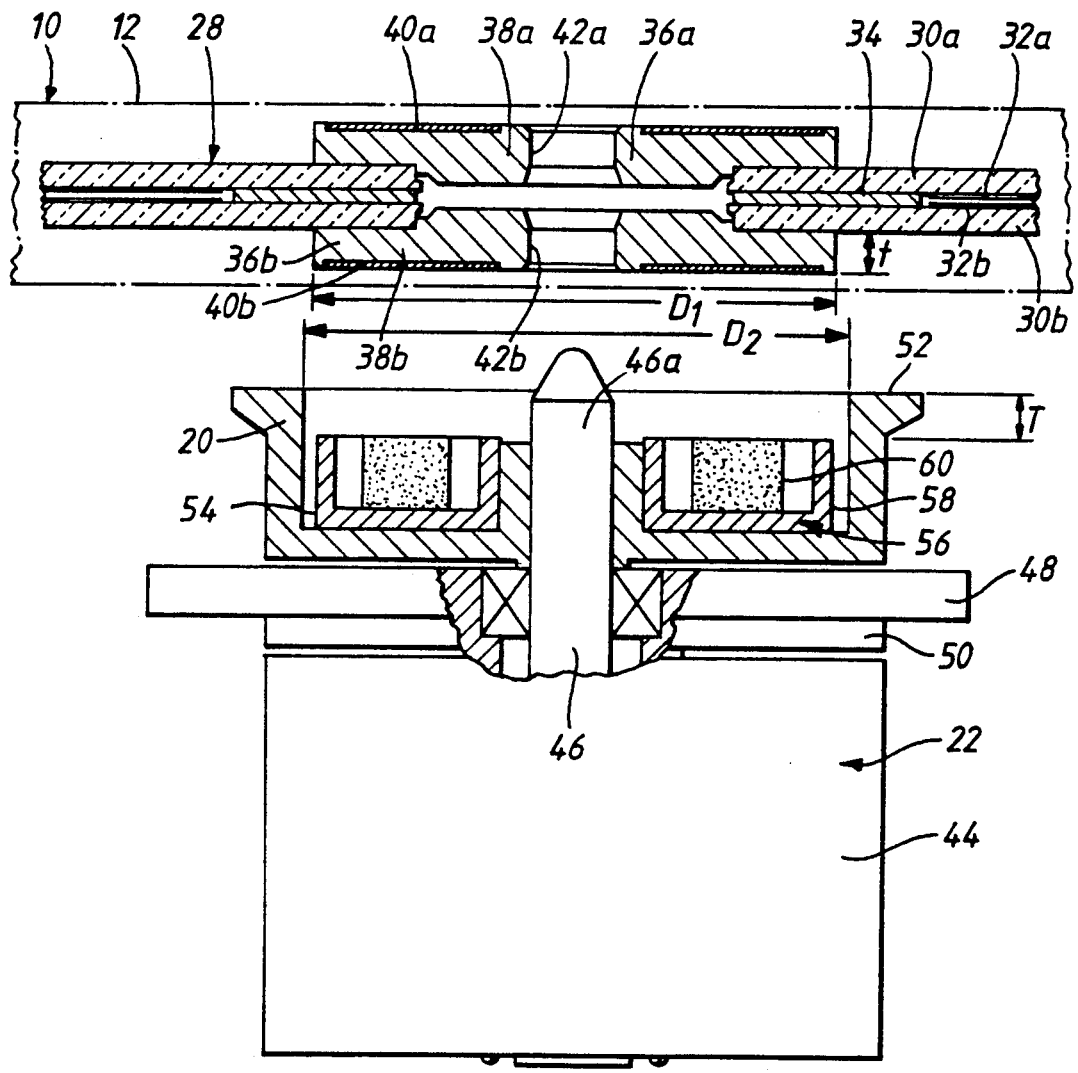
FIG. 2 is a side view, partially in cross-section, of the apparatus with the information memory medium according to the present invention.
Figure 3:
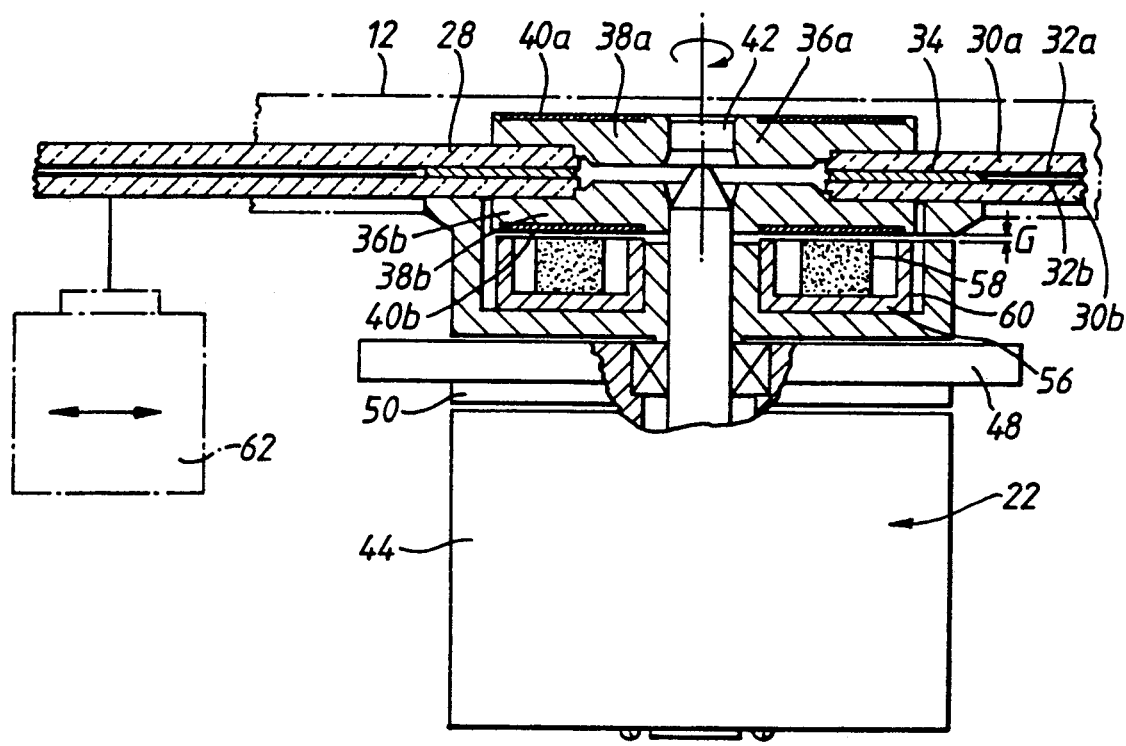
FIG. 3 is a side view, partially in cross-section, of the apparatus with the information memory medium mounted on the drive mechanism according to the present invention.

As shown in FIG. 1, cartridge 12 including optical recording disk 10 is adapted to be inserted into an information processing apparatus 14 through a medium slot 16 thereof. Optical recording disk 10 is automatically introduced into apparatus 14 in the direction of an arrow as shown in FIG. 1, by a medium guiding/loading mechanism (not shown). During this operation, a shutter 18 provided on cartridge 12 is opened so as to expose the center portion of optical recording disk 10. As shown in FIGS. 2 and 3, thereafter, optical recording disk 10 is automatically mounted on a turntable 20 located in a drive mechanism 22 for rotating optical recording disk 10. A state indicator 24 and a cartridge eject switch 26 are disposed at the bottom right of the front of apparatus 14. State indicator 24 indicates an apparatus operation state, a ready state or a cartridge inserted state. Cartridge eject switch 26 is pressed by an operator when cartridge 12 is ejected from apparatus 14 through slot 16.

A body 28 of optical recording disk 10 has two disk-shaped substrates 30a and 30b, and recording layers 32a and 32b. Substrates 30a and 30b are formed from glass or optically transparent plastic materials, such as acrylic resin, polycarbonate, and the like. Also, substrates 30a and 30b take the form of a disk having an internal diameter of about 15 mm, an external diameter of about 130 mm and a thickness of about 1.2 mm. The two substrates 30a and 30b are held together through an inner spacer 34 and an outer spacer (not shown). Recording layers 32a and 32b made of material including Te are deposited on inner surfaces of substrates 30a and 30b, respectively. Information is recorded in the form of pits on recording layers 32a and 32b.

Also, optical recording disk 10 is provided with attractable members 36a and 36b at the central portions of the respective outer surfaces of substrates 30a and 30b. Attractable members 36a and 36b are disk-shaped and have centering members 38a and 38b and magnetic members 40a and 40b. Centering members 38a and 38b are formed of a material whose coefficient of thermal expansion resembles that of substrates 30a and 30b and have central holes 42a and 42b for centering body 28 on turntable 20. Magnetic members 40a and 40b are completely flat and formed of a metal plate, such as Cr stainless steel and are attached to centering members 38a and 38b.

Even if optical recording disk 10 is subjected to any thermal effect such as a change of ambient temperature, magnetic members 40a and 40b may be spaced so as to absorb the difference in the degree of thermal expansion between magnetic members 40a and 40b, and the combination of substrates 30a and 30b and centering members 38a and 38b, attributable to their different coefficients of thermal expansion as will be explained in more detail below. Thus, information may be processed reliably and stably without causing any distortion in substrates 30a and 30b of optical recording disk 10.

Drive mechanism 22 for rotating optical recording disk 10 has a DC motor 44 for a drive source, a turntable 20 mounted on a rotating shaft 46 of motor 44, a frame 48 for supporting motor 44, and a control board 50 for controlling the operation of motor 44.

Turntable 20 is formed of nonmagnetic metal and has a support surface 52 perpendicular to shaft 46. Also, turntable 20 is formed with a circular depression 54. Depression 54 is coaxial with shaft 46, and opens toward support surface 52. Depression 54 has a magnetic attraction member 56 including a ring-shaped yoke 58 and a magnet 60. Magnetic attraction member 56 magnetically attracts attractable members 36a and 36b provided on optical recording disk 10.

Thus, housed in depression 54, magnetic attraction member 56 may fully exhibit its attraction force for mounting optical recording disk 10 on turntable 20. Also, diameter $D_2$ of depression 54 is greater than diameter $D_1$ of attractable members 36a and 36b provided on optical recording disk 10. The distance between top faces of yoke 58 and magnet 60, and support surface 52 of turntable 20 is defined as a reference distance T. Distance T is greater than a height t of the projection of attractable members 36a and 36b provided on optical recording disk 10. Body 28 of optical recording disk 10, therefore, is mounted so as to keep direct contact with support surface 52 of turntable 20 when attractable member 30b, for example, is attracted by magnet 60 of magnetic attraction member 56.

Rotating shaft 46 of motor 44 has a positioning portion 46a to support, rotate, and locate optical recording disk 10. Positioning portion 46a engages with center hole 42b of lower attractable member 36b when the optical recording disk 10 is mounted on the turntable 20.

As shown in FIG. 3, an optical head 62 is located opposite the undersurface of optical recording disk 10 which is rotated by drive mechanism 22. Optical head 62 is moved by a linear motor (not shown) in the radial direction of optical recording disk 10. Optical head 62 has a semiconductor laser, an objective lens, a photodetector, and so forth, to perform information processing, such as recording or reproducing, on or from a recording layer 32b formed on underside substrate 30b of optical recording disk 10.

Figure 4:
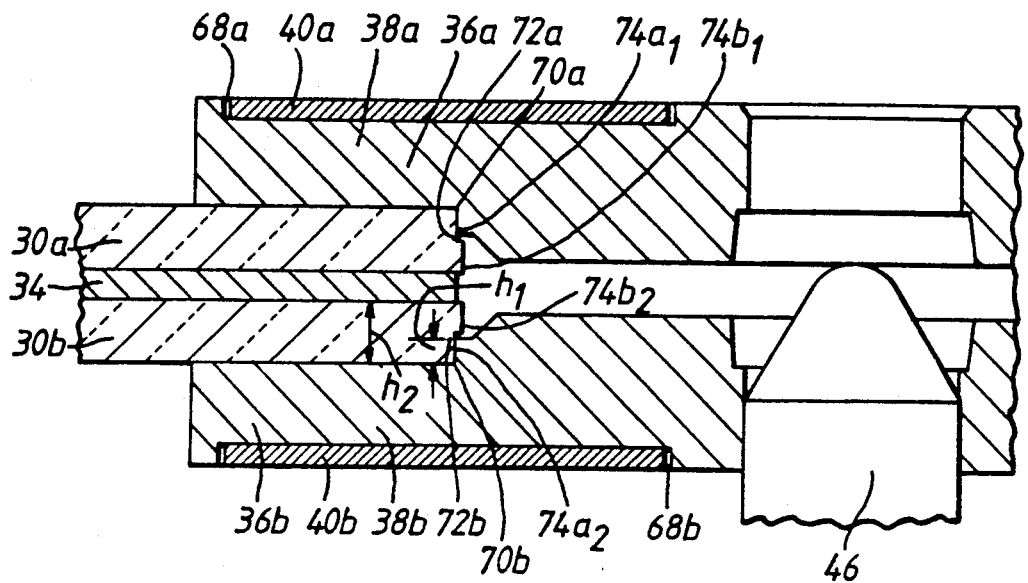
FIG. 4 is an enlarged sectional elevational view of the information memory medium of the present invention.
Figure 5:
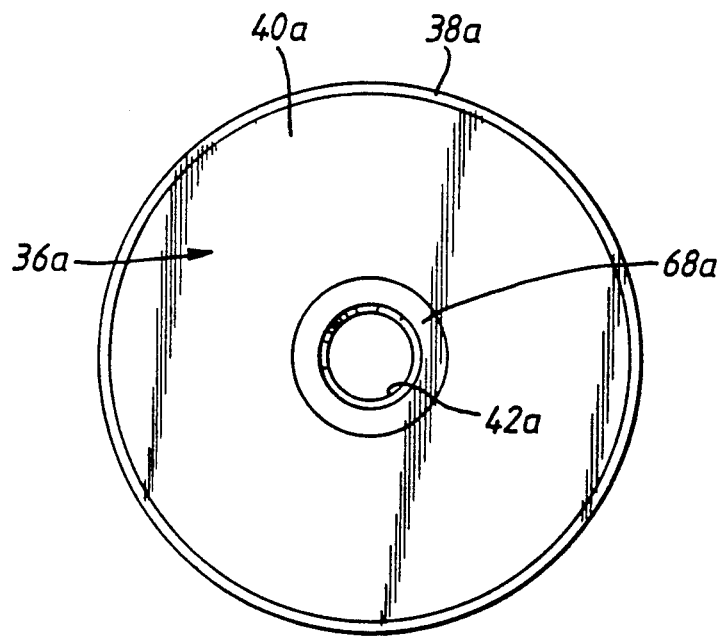
FIG. 5 is an enlarged plan view of an attractable member of the information memory medium of the present invention.

As shown in FIGS. 4 and 5, magnetic members 40a and 40b of attractable members 36a and 36b are formed from a metal plate into a completely flat and annular-shaped body, having apertures 66a and 66b in the center. Centering members 38a and 38b. have annular depressions 68a and 68b formed on the outer surfaces thereof. Magnetic members 40a and 40b are located in annular depression 68a and 68b. Also, magnetic members 40a and 40b are bonded to centering members 38a and 38b by means of a bonding agent. Therefore, magnetic members 40a and 40b may be easily formed because of their completely flat and annular-shaped body. Further, magnetic members 40a and 40b may be simply mounted to centering members 26a and 26b by means of a bonding agent.

Depressions 68a and 68b have an inner diameter shorter than an inner diameter of each of magnetic members 40a and 40b and an outer diameter larger than an outer diameter of each of magnetic members 40a and 40b. Therefore, magnetic members 40a and 40b are slightly movable in the direction parallel to the surface of substrates 30a and 30b. As a result, differences in thermal expansion can be absorbed.

Centering members 38a and 38b are a discoid of thickness t and have ring-shaped projections 70a and 70b coaxial with center holes 42a and 42b. Projections 70a and 70b fit in holes 72a and 72b of corresponding substrates 30a and 30b. Projections 70a and 70b are fixedly bonded to the outer surface of substrates 30a and 30b, or the opposite surface thereof, i.e., the surface on which recording layers 32a and 32b are formed, respectively. Thus, centering members 38a and 38b are coaxially positioned relatively to substrates 30a and 38b. Also, centering members 38a and 38b are bonded to substrates 30a and 30b by means of a bonding agent, such as epoxy resin.

In order to shorten the time for forming substrates 30a and 30b, bores 72a and 72b of substrates 30a and 30b are formed during the process of injection molding. Bores 72a and 72b, formed in this manner, including large diameter portions $74a_1$ and $74a_2$ and small-diameter portions $74b_1$ and $74b_2$ are formed by ripping off the resin at the gate portion by means of a punch. Moreover, the diameter of portion $74a_1$ and $74a_2$ are high in accuracy, while the inner peripheral surface of portions $74b_1$ and $74b_2$ are not smooth, and their diameter are low in accuracy Recording layers 32a and 32b are formed on that surface of each substrates 30a and 30b on the side of portions $74b_1$ and $74b_2$.

As described above, large-diameter portions 74a₁ and 74a₂ of bores 72a and 72b are formed with higher dimensional accuracy than small-diameter portions 74b₁ and 74b₂. Therefore, height h1 of projections 70a and 70b of each centering members 38a and 38b is shorter than axial length h2 of portions 72a and 72b so that projections 70a and 70b may engage only portions 74a and 74b of higher accuracy. Thus, centering members 38a and 38b are fixed with high positional accuracy, without being substantially eccentric to substrates 30a and 30b.

Bores 72a and 72b of each substrates 30a and 30b are worked with high accuracy, so as to be coaxial with a spiral pre-groove (not shown) for recording and reproduction, formed on substrates 30a and 30b. Likewise, the outer peripheral surface projections 70a and 70b and center holes 42a and 42b of each centering members 38a and 38b are worked with high accuracy, so as to be coaxial with each other. Thus, when centering members 38a and 38b are pre-groove is accurately in alignment with that of holes 42a and 42b or the center of rotation of substrates 30a and 30b. It is, therefore, possible to prevent lowering of recording/reproducing accuracy or increase of access time, which will be caused if the pregroove is eccentric to the rotational center of substrates 30a and 30b.

From an idealistic viewpoint, substrates 30a and 30b and centering members 38a and 38b should be formed of the same material. The reason is that if substrates 30a and 30b and centering members 38a and 38b thermal expansion, bonded or fitted regions between the substrates 30a and 30b and centering members 38a and 38b will be distorted in response to a temperature change.

It is to be understood that the present invention is not limited to the embodiments described above, and that various changes and modifications may be effected therein by one skilled in the art without departing from the scope or spirit of the invention.

In the embodiments described above, an optical recording disk with two substrates each having a recording layer is used for the information memory medium. Alternatively, however, the information memory medium may be provided with, e.g., a so-called single-side recording type disk that has a recording layer on only one side of the disk, and a disk whose both substrate surfaces are bonded without an intervening spacer. Further, magnetic attraction members may be formed only of a magnet.

Obviously, numerous additional modifications and variations of the present invention are possible in light of the above teachings. It is therefore to be understood that

What is claimed as new and desired to be secured by Letters Patent of the United States is:

1. An information memory medium adapted for processing information using a drive mechanism having a turntable for rotating said information memory medium and a magnetic attraction member for magnetically attracting said information memory medium toward the turntable, said information memory medium comprising:

a disk-shaped body having a recording layer for storing information and including a centering member, disposed on the surface of said body at the central portion of said body, for centering said body on the turntable, the centering member having a ring-shaped projection coaxial with the center surfaces for fixedly bonding to the outer surface of said disk-shaped body, said centering member including a magnetic member having a different coefficient of thermal expansion than said centering member attached to said centering member and adapted to be attracted by the magnetic attraction member, said magnetic member having a completely flat and annular-shaped body;

means for spacing said magnetic member from said body in a way to absorb a difference in thermal expansion between said magnetic member and said centering member, wherein said centering member is formed with at least one depression therein, said magnetic member formed in said depression and having a smaller diameter than said depression, thereby spacing said magnetic member from said depression in said centering member of said body; and a bonding agent layer between said centering member and said magnetic member so as to bond said magnetic member to said centering member.

2. An information memory medium adapted for processing information using a drive mechanism having a turntable for rotating said information memory medium and a magnetic attraction member for magnetically attracting said information memory medium toward the turntable, said information memory medium comprising:

a disk-shaped body having a recording layer for storing information;

a centering member, disposed on the surface of said disk-shaped body at a central portion of said body, for centering said disk body on the turntable, the centering member having a ring-shaped projection coaxial with the center surfaces for fixedly bonding to the outer surface of said disk-shaped body, said centering member having an annular depression on an outer surface thereof, wherein a thermal expansion characteristic of said centering member being substantially the same as a thermal expansion characteristic of said disk-shaped body, such that both will expand and contract by substantially same amounts under substantially same temperature conditions;

a completely flat and annular-shaped magnetic member adhered on the annular depression of the centering member and adapted to be attracted by the magnetic attraction member, said completely flat and annular-shaped magnetic member having a material which has a thermal expansion characteristic different than said centering member, wherein said magnetic member has an inner diameter longer than an inner diameter of said annular depression and an outer diameter shorter than an outer diameter of said annular depression, so that said magnetic member is movable by a small amount in a direction parallel to a surface of said centering member and not movable in a direction perpendicular to the surface of the centering member while said magnetic member and said centering member expands and contracts by substantially different amounts under substantially same temperature conditions.

* * * * *